MICROMODULAR PACKAGE AND METHOD OF SEALING SAME

Filed Sept. 3, 1964 3 Sheets-Sheet 1

INVENTORS:
Sydney Dix
David W. Davis
Martin L. Sklena
Robert M. Sutherland
By Smyth, Roston & Pavitt
Attorneys

MICROMODULAR PACKAGE AND METHOD OF SEALING SAME

Filed Sept. 3, 1964 3 Sheets-Sheet 2

INVENTORS:
Sydney Dix
David W. Davis
Martin L. Sklena
Robert M. Sutherland
By Smyth, Roston & Pavitt
Attorneys

MICROMODULAR PACKAGE AND METHOD OF SEALING SAME

Filed Sept. 3, 1964

INVENTORS
Sydney Dix
David W. Davis
Martin L. Sklena
Robert M. Sutherland
By Smyth, Roston & Pavitt
Attorneys

3,382,342 MICROMODULAR PACKAGE AND METHOD OF SEALING SAME

Sydney Dix, David W. Davis, and Martin L. Sklena, Costa Mesa, and Robert M. Sutherland, Redondo Beach, Calif., assignors, by mesne assignments, to GTI Corporation, Providence, R.I., a corporation of Rhode Island Filed Sept. 3, 1964, Ser. No. 394,143
19 Claims. (Cl. 219—85)

ABSTRACT OF THE DISCLOSURE

The present invention relates to electronic devices and more particularly to means for packaging electronic devices by a sealing machine. The sealing machine is provided with a large number of heating units for simultaneously heating a corresponding number of micromodular packages. Each of the heating units includes a heating element that transfers heat into a junction between the cover and sidewall portions of the package. Each heating unit is constructed of a plurality of segments and the segments have different configurations so as to produce different amounts of heat in the different junction portions. The different amounts of heat are used so as to compensate for the varying amounts of heat transferred through the sidewalls. The heating element, therefore, provides for a uniform amount of heat around the junction so as to minimize the heat transfer into the electrical element contained within the micromodular package. The present invention also includes the use of a heat sink which also may be constructed of a plurality of segments so as to compensate for changes in heat transfer. The use of the heating element and heat sink, therefore, minimizes any damage to the electrical element within the micromodular package. Other aspects of the present invention are accurate transfer and aligning means.

A large number of solid state electronic components such as semiconductive devices like transistors, diodes, etc., are presently available for performing various electronic functions. Unfortunately, the semiconductive material in such a device is of a very delicate nature and must be hermetically sealed in an outer housing that protects it from the surrounding environment. Although the semiconductive device per se may be very compact and light weight, the housing is of such proportions as to greatly increase the overall bulk, size and weight of the component over the actual semiconductive device per se. After the semiconductive device is sealed in a suitable housing, it may be interconnected with other components and/or devices of a similar nature to form a complete circuit. The interconnections which are normally made by means of wires, etc., further increase the size and weight of the resultant circuit manyfold over the actual size and weight of the components employed therein.

To reduce the size, cost, weight, unreliability and complexity of the circuit, it has been proposed to "lay down" a large number of different components in various regions of a single semiconductive wafer to form an "integrated micromodular circuit" that is completely self-contained, or, alternatively, to form a module for interconnection with one or more similar modules to form a more complete circuit.

Since the semiconductive wafers employed in integrated circuits are also of a delicate nature and are adversely affected by moisture, dirt, various contaminating materials, etc., they must be hermetically sealed in a suitable package such as a so-called "micromodular package." The most common form of package is the so-called "flat-pack" which is very thin and has a rectangular shape.

Following the formation of the various regions in a semiconductive wafer, the wafer has been installed in a first, or bottom, portion of a package. The wafer is then electrically connected to various external leads which extend outwardly through the bottom portion of the package. Following this, a second, or cover, portion is secured to the first portion so as to hermetically seal the wafer within a micromodular package.

Normally, the two portions of the package include a material such as a ceramic, a glass and/or a metal. So far, the only satisfactory means for reliably hermetically sealing such materials together has been to employ a sufficient amount of heat to cause at least a partial melting of one or both portions whereby they would be fused or molecularly bonded together. It has also been common to heat the two portions of the package to a sufficient temperature to cause a material such as a glass frit, solder, etc., to melt and seal the two portions together.

Historically, in order to seal micromodular packages, the two portions have been joined together and placed against a hot mandrel or in an oven. This has heated the package to a sufficient temperature to cause the glass frit, solder, etc., to melt and fuse the two portions together. However, it has also been effective to raise the temperature of the entire package, including the semiconductive wafer therein, to the temperature at which the fusion or bonding has occurred.

Unfortunately, semiconductive wafers are sensitive to heat and if subjected to excessive temperatures they will permanently change their characteristic or be completely destroyed. Accordingly, when sealing such a package it has been necessary to employ carefully selected materials and to use low-melting solders, glass frits, etc., and to very carefully heat the to-be-sealed micromodular package to a temperature slightly below the critical temperature where damage to the semiconductive wafer occurs.

The temperatures at which acceptable solders, glass frits, etc., melt are very close to the critical temperatures for the semiconductive wafer. As a consequence, the temperatures to which the micromodular packages have been heated during the bonding operation have been very accurately maintained within a very narrow range. If a micromodular package were heated even slightly above this narrow range, the characteristics of one or more of the various regions of the wafer were permanently altered or destroyed. On the other hand, if a micromodular package were not heated into the narrow range, a perfect seal was not formed and the resultant micromodular package was a so-called "leaker."

As a result of the foregoing limitations, an extremely large number of the early micromodular packages were defective and of unacceptable quality. Also, because of the relatively low maximum operating temperatures, it was impossible to employ certain highly desirable materials such as the so-called "hard glasses," like 7052 glass. If the mating surfaces on the two portions of the package are "hard glass" and they are heated above their melting point, they will fuse directly to each other. However, since the melting points for such glasses are far higher than the critical temperature of the silicon wafer, it has been impossible to seal such materials by employing an oven or heating mandrel. It was also frequently very difficult, if not impossible, to make all portions of the package out of materials having similar coefficients of thermal expansion.

More recently, the foregoing difficulties and limitations have been overcome by employing the sealing method and apparatus disclosed and claimed in copending application Ser. No. 337,081, filed Jan. 10, 1964, in the name of Sydney Dix. This method and apparatus is effective to concentrate the heat in the region of the junction between the cover portion and the bottom portion of the package and to limit the transfer of heat into other portions of the package. More particularly, a heating element is provided that engages only the periphery of the cover portion so as to transfer heat only into the periphery. This sealing heat flows through the periphery of the cover and into the junction between the periphery and the bottom portion so as to concentrate the heat in the junction. By concentrating the heat in the region of the junction or seal, a minimum amount of heat is required. In addition, by properly controlling the flow of sealing heat, the amount of heat reaching the semiconductive wafer may be limited without interfering with the amount of heat supplied to the junction. As a consequence, the temperature of the seal may be raised to any desired level. This not only insures the formation of a perfect seal each time but also permits the use of materials having higher melting points and more desirable thermal and mechanical characteristics.

The sealing apparatus of copending application Ser. No. 337,081 has been capable of reliably sealing micromodular packages. However, it has required a certain amount of skill to operate and has a limited rate at which the packages could be sealed. Also, under some operating conditions some difficulties have been encountered in sealing some forms of micromodular packages. More particularly, due to the arrangement of the package, the amount of heat loss from the to-be-sealed junction varies from one portion to the next. As a consequence, some portions of the junction have been overheated while other portions have been underheated.

Although the sealing method and sealing apparatus of copending application Ser. No. 337,081 are effective to seal the micromodular packages, the present invention provides a new and improved sealing method and sealing apparatus for performing the method. The sealing apparatus is very convenient to use by even an unskilled person and is capable of sealing large numbers of micromodular packages at a high rate of speed. In addition, the apparatus is capable of more accurately sealing any desired micromodular package.

In one operative embodiment of the present invention, a sealing machine is provided which has a large number of heating units for simultaneously heating a corresponding number of micromodular packages. Each of the heating units includes a heating element that transfers heat into the junction between the cover and the base portions of the package. Each heating element is constructed and arranged to produce varying amounts of heat in the various portions thereof. Each portion of the element provides the correct amount of heat to heat the associated portion of the to-be-sealed junction to the correct temperature for producing a seal. In addition, each of the heating units is readily replaceable for repair or service and also to permit a package of any size or configuration to be sealed.

In addition, means are provided for accurately loading the parts of to-be-sealed packages onto the heating elements. This insures an accurate sealing of the packages and a transfer of the parts onto the heating elements at high rates of speed whereby the machine and the operator will operate efficiently.

These and other features and advantages of the present invention will become readily apparent from the following detailed description of a limited number of embodiments thereof, particularly when taken in connection with the accompanying drawings wherein like reference numerals refer to like parts and wherein.

Figures 1, 2:
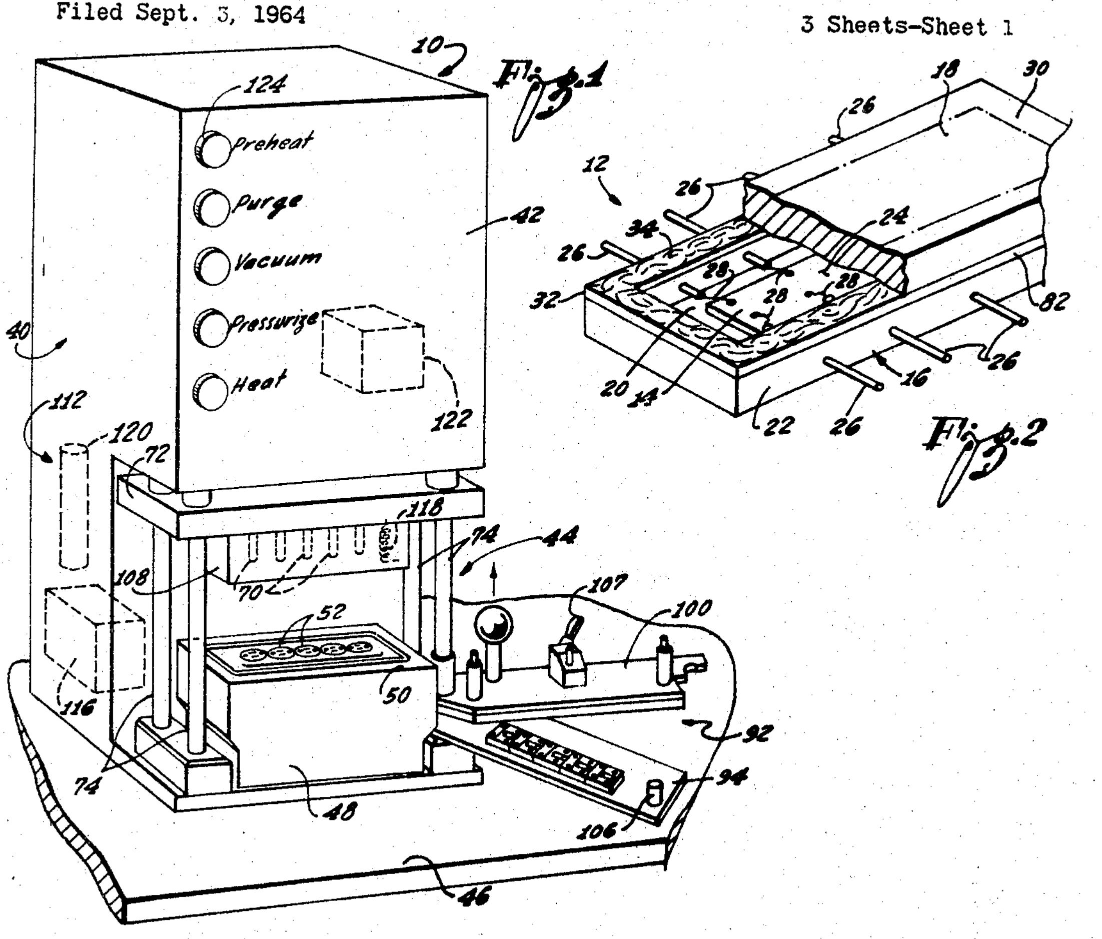
FIGURE 1 is a perspective view of a sealing machine embodying one form of the present invention and particularly adapted for sealing micromodular packages.
FIGURE 2 is a broken-away perspective view of a portion of a micromodular package sealed by the sealing machine of FIGURE 1.
Figure 3:
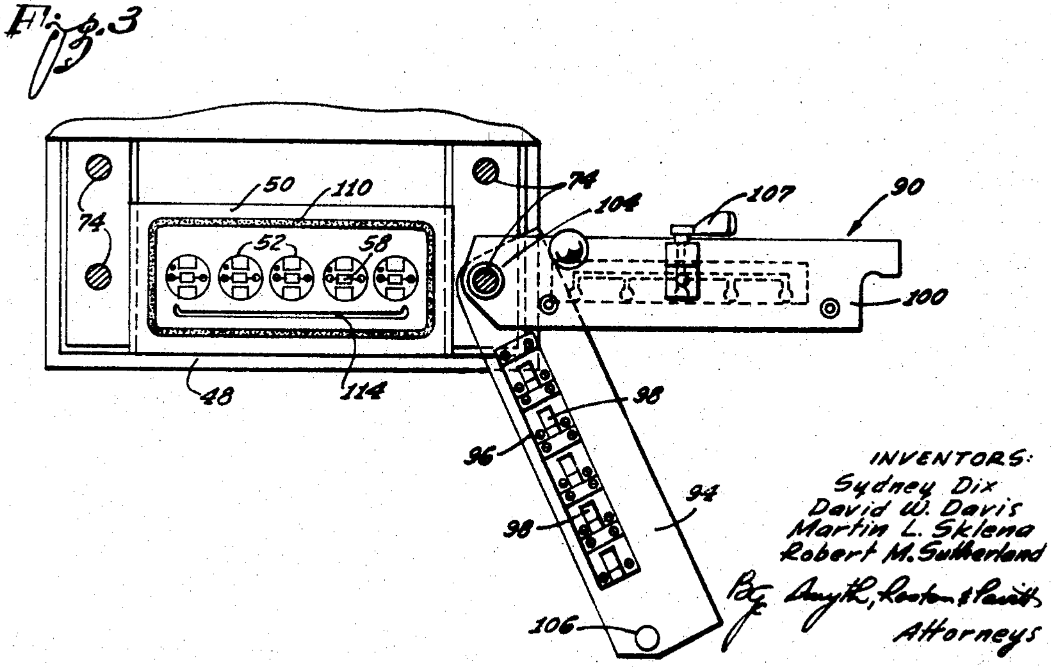
FIGURE 3 is a fragmentary plan view of a portion of the present sealing machine.
Figure 7:
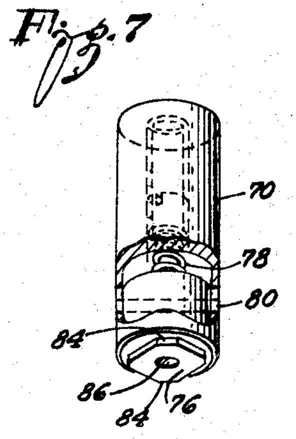
FIGURE 7 is a perspective view of a heat sink for use with the heating unit of FIGURES 4 to 6.
Figure 4:
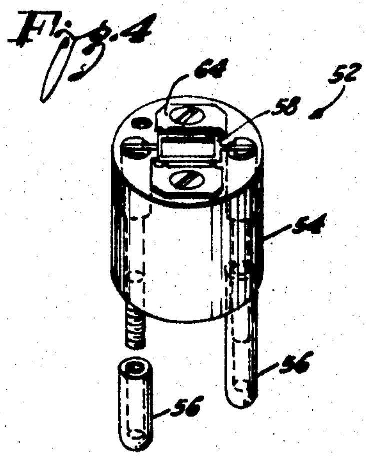
FIGURE 4 is a perspective view of a heating unit for use in the sealing machine of FIGURE 1.
Figure 5:
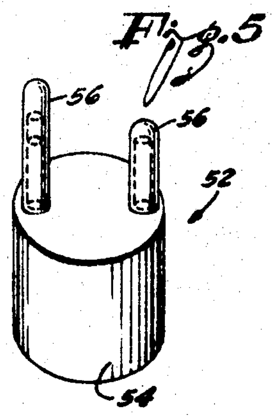
FIGURE 5 is a perspective view of the heating unit of FIGURE 4 in an inverted position.
Figure 6:
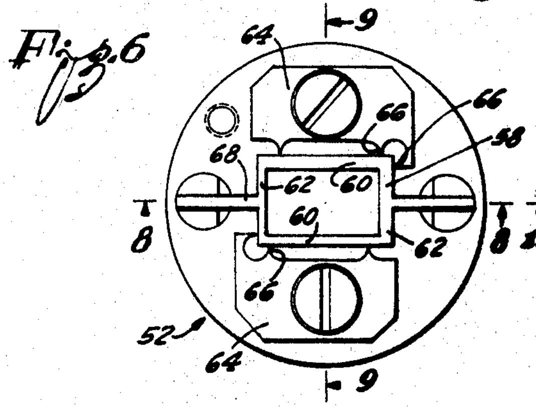
FIGURE 6 is a plan end view of the heating unit of FIGURE 4.

Referring to the drawings in more detail, the present invention is embodied in a sealing method and a sealing machine 10 particularly adapted for sealing micromodular packages containing semiconductive wafers. Although the micromodular packages may be of any desired form and shape, in the present instance (as best seen in FIGURE 2), the packages 12 are of the so-called "flat-pack" variety for hermetically sealing an integrated circuit containing several different components. The integrated circuit contained within a single package may be completely self-contained or it may be only a part or module in a more comprehensive structure.

The various components included within the integrated circuit may be of any desired variety, for example, active components such as diodes, transistors, etc., or passive components such as resistances, capacitances, inductances, etc. The components contained within the micromodular package 12 may include a plurality of physically separate devices that are interconnected with each other. However, it has been found desirable to form the circuit from a single semiconductive chip or wafer 14. The wafer 14 forms a common substrate for all of the various components and normally includes a silicon material. However, the wafer 14 may include a gallium arsenide, germanium or any other material which exhibits suitable semiconductive properties. The various components which are to be employed in the circuit are "laid down" on the wafer 14 by any suitable means which are well known in the art. The "laying down" process produces a plurality of zones or regions which possess semiconductive barriers having preselected electrical characteristics. At least a portion of these regions are electrically interconnected with each other so as to form a completely integrated circuit.

After the wafer 14 has been completely formed, it is hermetically sealed in the micromodular package 12 to protect the wafer 14 and the components thereon from contamination from the surrounding environment. The specific size, shape and design of the micromodular package 12 will vary with the particular application and the configuration of the circuit. However, the present micromodular package 12 is a so-called "flat-pack" having, by way of example, overall or outside dimensions on the order of about ¼ of an inch long by about ⅛ of an inch wide by about $\frac{1}{16}$ of an inch thick.

As best seen in FIGURE 2, the present micromodular package 12 includes a first or bottom portion 16 and a second or cover portion 18. The first or bottom portion 16 includes a base 20 having a length and width which correspond respectively to the length and width of the finished micromodular package 12.

The base 20 is normally just sufficiently thick to insure its having a structural rigidity which will prevent its being damaged during normal usage and to insure the base 20 being impervious to the environment in which the package 12 will be used. Although the base 20 may consist of any desired material, it has been found that materials such as metal, glass and/or ceramic are particularly well suited for this type of construction.

A side wall 22 is provided around the periphery of the base 20. This sidewall 22 may be formed integrally with the base 20 such as by molding the sidewall 22 and base 20 from a material like glass or ceramic. Alternatively, the sidewall 22 may be a separate member that is bonded to the base 20. For example, a glass or ceramic sidewall 22 may be hermetically bonded onto a metal base 20.

The side wall 22 extends completely around the base 20 and does not have any openings or discontinuities therein. The exterior surface of the side wall 22 is normally substantially aligned with the outer edge of the base 20 and accordingly will have outside dimensions which are identical to those of the base 20.

The sidewall 22 projects upwardly from the base 20 to define an upwardly opening space 24. This space 24 should be of sufficient size to permit the semiconductive wafer 14 being placed within the sidewall 22 and adjacent to the base 20. The sidewall 22 should have a height which is slightly greater than the thickness of the wafer 14 whereby the wafer 14 will be completely disposed inside of the sidewall 22.

In order to permit interconnecting the various regions of the wafer 14 with external circuitry, a plurality of electrical leads 26 may be provided. The inner ends of the leads 26 are disposed in the space 24 adjacent the wafer 14 whereby they may be electrically connected directly to the regions in the wafer 14 by electrical conductors 28. The outer ends of the leads 26 project from the package 12 for being electrically connected to any desired external circuit.

Although the leads 26 may be arranged in any desired pattern, they normally project from the sidewall 22 in an arrangement similar to the pattern disclosed. Normally, the sidewalls 22 are made of a dielectric or electrically nonconductive material such as a glass or ceramic and the leads 26 are embedded in the sidewalls 22. The resultant sub-assembly is then heated to a sufficient temperature to vitrify and fuse the sidewalls 22 to the leads 26 and to the base 20. It should be noted that since the base 20 and the leads 26 are relatively insensitive to heat, the temperature of the subassembly may be raised to a sufficiently high level to insure a positive and complete fusing of the material in the sidewalls 22 to the leads 26 and to the base 20. At this point, the subassembly or bottom portion 16 will be converted into an integral structure that will be imperforate and free from any leaks.

After the foregoing structure has been provided, the semiconductive wafer 14 may be positioned on the base 20 inside of the sidewalls 22. The wafer 14 may be attached directly to the base 20 whereby it will be permanently and rigidly affixed thereto. The various regions within the wafer 14 are then interconnected with the inner ends of the electrical leads 26 by the electrical conductors 28. Alternatively, it may be accomplished by providing a mask over the wafer and depositing an electrically conductive film through various openings in the mask that register with the various regions and inner ends of the leads 26. This will make it possible for the various regions in the wafer 14 to be electrically interconnected with suitable external circuitry by means of the leads 26.

After mounting of the wafer 14 on the base 20, the second portion or cover 18 may be secured to the sidewall 22 to complete a hermetically sealed micromodular package 12 containing the wafer 14. The cover 18 may be of any desired variety and may be secured to the sidewall 22 by any suitable means. However, the present cover 18 is a single member having a periphery that registers with the sidewall 22. The cover 18 may consist of any desired material and need only be thick enough to provide the necessary strength. However, the thermal expansion characteristics of the cover 18 should be substantially identical to those of the bottom portion 16 so as to eliminate the possibility of thermal stress being created within either the cover 18 or the sidewall 22.

By way of example, the sidewall 22 and/or the base 20 of the lower portion 16 may consist of a ceramic material or a glass and the cover 18 may also be a ceramic or glass of substantially identical composition. As will become apparent subsequently, a so-called "hard glass" such as 7052 may be employed even though the glass has a melting temperature that is far in excess of the critical temperature for a silicon wafer 14. Alternatively, if it is so desired, the cover 18 may be a metal. In the present instance the cover 18 includes a metal such as Kovar.

The periphery 30 of the cover 18 may be hermetically bonded to the top of the sidewall 22 by any suitable means that will be sufficiently strong and tight. By way of example, if a glass cover 18 is employed, the periphery 30 of the cover 18 may be melted and caused to fuse onto the sidewall 22. Also, if a glass or metal cover 18 is employed, a glass frit or similar material may be provided between the sidewall 22 and the periphery 30. The frit may then be heated to its melting point and thereby bond the cover 18 to the sidewall 22. If, as in the present instance, a metal cover 18 is employed, it may be soldered to the sidewall 22. This may be accomplished by bonding a complementary metal frame 32 to the top of the sidewall 22 at the time the bottom portion 16 is formed. A solder preform 34 is then provided between the cover 18 and the frame 32 and sufficient heat applied to melt the solder whereby the cover 18 will be securely soldered to the frame 32.

A seal of the foregoing type or any other type may be formed by employing the sealing machine 10 of FIGURE 1. The present machine 10 includes an enlarged housing 40 which encloses various operative elements, control means, indicators, etc. The front panel 42 of the housing 40 includes an inwardly recessed section containing a work station 44 where the micromodular packages 12 are sealed. The machine 10 is adapted to be seated on a suitable support such as a table top 46 whereby the work station 44 will be conveniently located for the operator.

The work station 44 includes a support 48 having a substantially horizontal work surface 50 upon which the micromodular packages 12 are placed when it is desired to seal them. A separate heating unit 52 is provided in the work surface 50 for each micromodular package 12 to be sealed. These heating units 52 are the primary source of the heat that seals the packages 12. It should be noted that, although any desired number of packages may be simultaneously sealed, in the present instance, the machine 10 is particularly adapted to seal up to five separate packages 12 at a time. Accordingly, five separate heating units 52 are provided in the work surface 50.

The heating units 52 may be made integrally with the support 48 so as to constitute a permanent part thereof. However, it has been found highly desirable to make the heating units 52 of the "plug-in" type. This greatly facilitates servicing and repairing the heating units 52. Also, it permits very quickly changing the characteristics of the operative heating units 52 by merely unplugging a unit and replacing it with a second unit having different dimensions and characteristics. Such an arrangement will make the sealing machine 10 very versatile. A first set of heating units may be employed to seal a first series of micromodular packages 12. Following this, the heating units 52 may be unplugged and replaced with a second set of heating units having dimensions and characteristics corresponding to a different package. The machine 10 may then be used to seal a series of the new packages 12.

Each of the heating units 52 includes a cylindrical plug 54 which is adapted to fit snugly into a complementary cylindrical socket extending vertically downwardly into the support. Preferably, all of the sockets in the support 48 and all of the plugs 54 are of standard dimensions whereby the heating units 52 are completely interchangeable and may be employed at any location on the machine 10. The plug 54 is preferably of a material that acts as a good thermal and electrical insulation. By way of example, the plug 54 may include a vitrified lava.

The plug 54 is adapted to easily fit into and out of the socket so that the upper end is substantially flush with the work surface 50. In order to facilitate inserting the plug 54 into the socket and extracting it therefrom, a threaded passage may be provided in the end of the plug 54. A threaded extractor tool may be screwed into this passage to force the plug 54 into position or to pull it out of the opening.

The heating units 52 may include a pair of electrical contacts 56 which project downwardly from the bottom of the plug 54. When the plug 54 is inserted into one of the sockets, the contacts 56 will electrically engage a suitable connector or bus disposed inside of the support 48.

Each of the heating units 52 includes a heating element 58 that is secured to the exposed end of the plug 54. The heating element 58 has a shape that corresponds to the size and shape of the cover 18 and particularly to the periphery 30 of the cover 18. In the present instance, since the periphery 30 of the cover 18 is rectangular, the heating element 58 has a rectangular shape with a pair of parallel sides 60 and a pair of parallel ends 62. In order to assist in accurately positioning the cover on the heating element 58, a pair of guides 64 may be secured to the end of the plug 54. These guides 64 include fingers 66 that are juxtaposed to the edges of the heating element 58 and are positioned to engage the sides and ends of the cover 18 and maintain the cover 18 in proper alignment on the heating element 58.

The opposite ends 62 of the heating element 58 include extensions or leads 68 that are connected to the exposed ends of the contacts 56. These extensions or leads 68 are electrically and mechanically connected to the electrical contacts 56 whereby a potential difference between the two contacts 56 will produce an electrical current flow through the heating element 58. Preferably, the contacts 56 are of large diameter and low resistance whereby large currents may flow through the contacts 56 and heating element 58 with substantially all of the power being dissipated in the heating element 58.

When a potential difference is applied between the two conductors 56, an electrical current flows through the heating element. The only material oppositon to this current is the resistance of the heating element 58 whereby substantially all of the power in the current will be converted into heat in the heating element 58. As is well known, the amount of heat developed within a heating element is a function of the product of the resistance and the square of the current. Thus, by varying the resistance of the heating element 58, the amount of heat may be varied to suit the particular micromodular package being sealed.

It should also be noted that by varying the resistance of the different portions such as the sides 60 or ends 62, the amount of heat from that portion may be varied. By way of example, the width and/or thickness of the side 60 or end 62 may be varied relative to the other portions. If the cross-sectional area of a portion is very small, there will be a large resistance and a large amount of heat will be produced in the portion. Conversely, if the portion has a large cross-sectional area, the resistance will be small and a small amount of heat will be dissipated.

When the cover is positioned on the heating element 58, the periphery 30 of the cover 18 will engage the ends of the fingers 66 on the guides 64. This will insure the cover 18 being accurately aligned with respect to the heating element 58 and preselected portions of the periphery in exact registry with the corresponding portions of the heating element. Since there is an intimate heat exchanging relation between the periphery 30 and the heating element 58, the heat produced in the element will flow directly into the periphery. The amount of heat transferred into any preselected portion of the periphery 30 will be proportional to the resistance of the corresponding portion of the heating element 58.

The second or bottom portion 16 of the package may be inverted and placed upon the cover 18 so that the sidewalls 22 will rest upon the periphery 30 of the cover 18. The fingers 66 will engage the edges of the sidewalls 22 and maintain the sidewalls 22 very precisely aligned with the heating element 58 and the periphery 30 of the cover 18.

A downwardly directed pressure may be applied to the bottom portion 16 to force it downwardly against the cover 18. This insures the sidewalls 22 being maintained properly seated on the cover 18 during the sealing operation. The surface on the sidewalls 22 or the frame 32 will be forced into intimate relation with the periphery 30 of the cover 18 so as to insure a transfer of heat therebetween and a perfect sealing.

In the present instance, the downwardly directed force is produced by a ram 70 carried by a platform 72 slidably disposed on a plurality of vertical guides 74. These guides 74 will limit the motion of the platform to a straight line toward and away from the work surface 50.

The ram 70 includes a plunger 76 that is positioned to engage the base 20 of a package 12 resting on a heating element 58. The plunger 76 is slidably disposed inside of the ram 70 and is biased outwardly by a spring 78. The plunger 76 will bias the bottom portion 16 onto the cover 18 with a force proportional to the amount of compression in the spring 78. By a proper choice of springs, each of the bottom portions 16 will be biased with the same forces.

It has been found desirable for the plunger 76 to be guided by means of pins 80 or other loose-fitting means that will permit a limited amount of "cocking" of the plunger 76 to occur. This will allow the bottom portion 16 to move around within a limited area as it settles onto the cover 18 when it is sealed thereto.

The heat developed in the heating element 58 will flow through the periphery 30 of the cover 18 across the junction 82 and into the sidewalls 22 from whence it will be dissipated into the base 20, the leads 26, etc. It may be appreciated that the heat in some portions of the sidewalls 22 will be dissipated at a faster rate than in other portions. For example, in those regions containing one or more electrical leads 26, a considerable amount of heat will enter the electrical leads 26 and be dissipated into space. It will thus be seen that the rate of heat dissipation will be greatest in the region of the leads and lowest in the regions free of the electrical leads 26.

Figure 10:
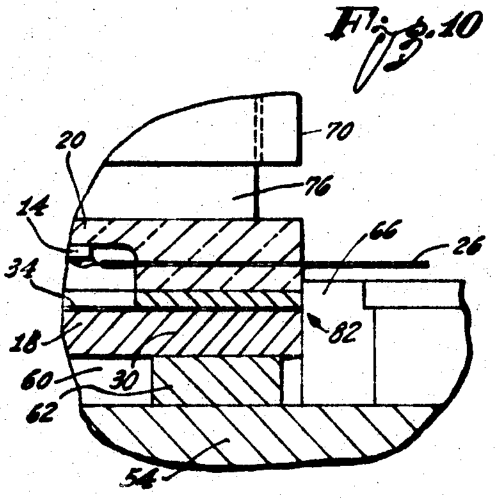
FIGURE 10 is a fragmentary view on a greatly enlarged scale of the portion of the sealing apparatus contained in circle 10 of FIGURE 9.

In order to compensate for these differences and provide a uniform temperature in all portions of the junction 82, the various dimensions of the heating element 58 are varied in the manner described above. Referring to FIGURE 10, a sidewall 22 containing leads 26 will dissipate a lot of heat and will tend to cool the adjacent portion of the junction 82. Accordingly, the width of the side 60 may be made small so as to have a high resistance. This will produce a larger amount of heat than the ends 62. The extra heat is directly proportional to the rate at which the heat is dissipated through the sidewalls. As a consequence, the temperature will be the same in all parts of the junction 82.

To further assist in controlling the temperature of the junction 82, the plunger 76 may be constructed and arranged to act as a heat sink. This will absorb heat from the base 20 and thereby reduce the temperatures of the sidewall 22 and the adjacent portions of the junction 82.

In the regions where the sidewalls 22 dissipate a large amount of heat, the plunger 76 may be of reduced size. As a result, the plunger 76 will absorb a minimum amount of heat and will permit the temperature to rise. The corners 84 may also be relieved to allow for the larger amount of heat loss. In the regions where the sidewalls dissipate the least heat, the plunger 76 may extend to the edge and thereby reduce the temperature.

The plunger 76 will act as a heat sink that will limit the amount of heat traveling through the base 20 to the wafer 14. This will limit the temperature of the wafer 14 to a safe range. The center 86 of the plunger 76 may be recessed to reduce the heat loss in this region. This will insure the base 20 having a more uniform temperature and less thermal stresses.

Although the various portions of the to-be-sealed packages may be positioned on the heating elements 58 by hand, it has been found desirable to provide means 90 for simultaneously positioning a to-be-sealed package on each of the heating elements 58. The present loading means 90 includes a fixture 92 which is mounted adjacent to the work station 44 so as to be convenient to the operator.

The present loading fixture 92 includes a stationary arm 94 that is attached to one of the vertical guides 74 so as to project outwardly from one side of the support 48. A separate mounting block 96 is provided for each of the heating units 52 provided on the support 48. Each of the blocks 96 includes a pocket 98 which is recessed inwardly to form at least a pair of alignments surfaces. A cover 18 may be positioned in the pocket 98 and then a bottom 16 may be placed on top of the cover 18. If the cover 18 and bottom 16 are forced against the alignment surfaces, they will be properly positioned with respect to each other for being sealed together. The pockets 98 and particularly the alignment surfaces are preferably separated from the vertical guide 74 by a distance that corresponds to the distance between the guide 74 and the corresponding heating elements 58.

A carrier or transport 100 may also be provided on the vertical guide 74 for transporting the to-be-sealed packages 12 to the heating elements 58. In the present instance, the carrier 100 includes an arm having a sleeve 104 which is rotatably and slidably disposed on the vertical guide 74 so as to be movable between a plurality of positions. In one position, the heating elements 58 and the blocks 96 are exposed. In another position, the carrier 100 is disposed over the arm 94 so as to cover the blocks 96 and in still further position the transport 100 is disposed over the support 48 so as to cover the heating elements 58.

The carrier 100 includes means for lifting the to-be-sealed packages and transporting them with the carrier 100 as it moves between the different positions. In the present instance, the covers 18 include a metal of a magnetic nature. Accordingly, lifting means includes magnets having sufficient strength to attract and lift the packages 12. A separate magnet is provided for each of the packages 12. All of the magnets are mounted on a retractable support for movement vertically through the carrier 100 in response to movement of a control lever 107. When the control lever 107 is in a first position, the magnets will project from the carrier 100 and will be capable of carrying the packages 12. When the lever 107 is in a second position, the magnets will be retracted into the carrier 100 so as to be separated from the packages 12 by a sufficient distance to prevent the packages being attracted by the magnets.

In order to employ the present invention for sealing micromodular packages 12, appropriate heating units 52 are first inserted into the sockets in the support 48. Each heating unit 52 is selected to have a heating element 58 shaped to register with the periphery of the cover 18 and to produce the optimum amount of heat for the packages to be sealed.

After the heating units 52 are installed, a plurality of covers 18 may then be loaded into the pockets 98 on the mounting blocks 96 in the loading mechanism 90. Following this, a plurality of solder preforms 34 are placed on the peripheries 30 of the covers 18 and inverted bottom portions 16 placed on top of the covers 18.

Next, the carrier or transport 100 may be swung into a position where the end of the transport engages the alignment pin 106. The transport 100 is then lowered onto the arm 94. The magnets will now all be aligned with the to-be-sealed packages. The control lever 107 is then moved to a position where the magnets are in contact with the packages 12. The transport 100 is then raised and swung over the support 48 until the end of the transport 100 engages the guide 74. The transport 100 is then lowered onto the work surface 50 so as to position the packages 12 on the heating elements 58. The control lever 107 is then moved to raise the magnets and release the covers 18 and bottoms 16. Following this, the transport 100 is raised and swung clear of the work station 44 whereby the sealing machine 10 may be actuated to seal all of the packages 12.

As soon as the sealing machine 10 is actuated, the platform 72 descends downwardly along the guides 74 until the plungers 76 in the end of the rams 70 engage the bases 20 of the inverted packages 12. The springs 78 will be effective to insure the bottom portions being firmly forced against the solder preforms 34 and cover 18.

A potential difference is next applied to the contacts 56 whereby a current will flow through the various portions of the heating elements 58. The current will generate heat in the various portions of each of the elements 58 in proportion to the resistances of the portions. A majority of the heat will be transferred directly into the periphery 30 of a cover 18, the solder preform 34 and the sidewalls 22. The amount of heat transferred into the solder preform 34 is adequate to cause the preform 34 to melt. Also, the periphery 30 and frame 32 will be heated sufficiently to insure the solder flowing onto all of the registering surfaces for hermetically soldering theretogether.

It has been found desirable to carefully control the environment surrounding the micromodular packages 12 prior to and during the time they are sealed. In order to accomplish this objective, a housing 108 may be attached to the platform 72 by means of a gas-tight seal. The housing 108 extends downwardly beyond the lower ends of the rams 70.

The lower end of the housing 108 forms an opening that is adapted to pass around the to-be-sealed packages 12 and engage the work surface 50 so as to form an air-tight chamber. In order to insure a gas-tight seal between the end and the work surface 50, it has been found desirable to provide a resilient gasket 110 that is recessed into the work surface 50 and completely surrounds the work surface. It will thus be seen that when the platform 72 is lowered to place the plungers 76 in engagement with the bases 20, the end will engage the gasket 110 and an air-tight chamber will be formed around the heating elements 58 and the micromodular packages 12 seated thereon.

In order to control the atmosphere within the chamber, suitable control means 112 may be enclosed within the housing 108. The control means 112 is interconnected with a vent 114 in the work surface 50 and thereby communicates with the sealed chamber. The control means 112 may include a vacuum pump 116 which is effective to draw air through the vent and evacuate the chamber.

The control means 112 may also include means for preheating the chamber and/or the to-be-sealed packages. This may be accomplished by means of a heater 118 disposed inside of the chamber. When this heater 118 is energized, the chamber and any micromodular packages 12 therein will be heated to an intermediate temperature. By way of example, this temperature may be on the order of about 200° F. This elevated temperature and reduced pressure will tend to cause any gases, etc., trapped in or on any portions of the package 12 or wafer 14 to be driven therefrom. It will also preheat the to-be-sealed packages 12 to a temperature that will prevent thermal stresses, etc. It will be noted that this temperature is far removed from the critical temperature at which the electrical characteristics of the wafer 14 are altered.

In addition or alternatively to the foregoing, the preheating operation may be performed by energizing the heating elements 58 to an intermediate level. The heating elements 58 will cause the to-be-sealed package to be heated up to an intermediate level. This level may be on the order of about 200° F. or such other level as will insure the elimination of any thermal stresses, etc.

Prior to, during and/or after the foregoing preheating and evacuating process, the entire chamber may be purged by circulating a gas from a gas supply 120 through the vent 114. Normally, an inert gas such as dry nitrogen is employed for this purpose. It may be seen that at the conclusion of these operations the atmosphere inside of the to-be-sealed packages will be free of any contaminating gases or other substances. Following the preheating and purging, a sufficient quantity of gas may be released from the supply 120 to increase the atmospheric pressure in the chamber to some desired elevated level such as several atmospheres.

After the pressure is at the desired level, the timer 122 may energize the various heating elements 58 by applying a potential difference between the two contacts 56. This will cause a current to flow through each of the heating elements 58 and generate heat proportional to the resistance of the heating element.

The heat will be transferred directly from the heating element 58 into the periphery 30 of the cover 18. From here, it will flow into the solder preform 34 and the frame 32 and heat them to a sufficient temperature to melt the solder and solder the cover periphery 30 to the frame 32.

Although the majority of the heat will be concentrated in the immediate region of the junction 82 between the periphery 30 and frame 32, a substantial portion of the heat will travel vertically upwardly through the sidewalls 22 and into the base 20. In those side walls having electrical leads 26 passing therethrough, a considerable quantity of heat will enter the electrical leads 26 and travel therethrough so as to be dissipated in the surrounding atmosphere. The dissipation of this heat will tend to lower the temperature of the adjacent sections of the sidewalls 22 and the solder preform 34 whereby those sections of the junction 82 will tend to be considerably cooler than the other sections.

However, the dimensions of the various portions of the heating element 58 are modified to produce corresponding variations in the amounts of heat produced. More particularly, the sides 60 of the heating element 58 adjacent the leads 26 has the highest resistance so that it will be the hottest. Thus, even though some portions of the sidewalls dissipate large quantities of heat, the temperature of the solder preform 34 will be substantially uniform.

The plunger 76 may also be constructed and arranged to control the temperature and to protect the wafer 14. The portions of the plunger 76 adjacent the sides having the leads may be set back a small distance. This will reduce the area in contact with the base 20 near these sides and, as a consequence, will reduce the amount of heat absorbed from these sides. Conversely, the plunger may have a large area in contact with the base 20 adjacent the remaining sidewalls. It will be seen that this will tend to make the amount of heat dissipated from the sidewalls more uniform. At the same time, the plunger will absorb a large amount of heat from the base 20 in the region of the wafer 14. As a consequence, the temperature of the wafer 14 will be limited to within a safe range even though the temperature of the junction 82 is raised far above that range. In addition, the plunger 76 may have one or more recesses that will control the temperature of the base 20 and prevent undue thermal distortions.

After the heating element 58 has been heated for a sufficient period to insure a complete melting of the solder and a uniform wetting of all the surfaces, the heating element 58 is de-energized. Following this, the pressure in the chamber is reduced to atmospheric pressure and the temperature reduced to a level that will permit the removal of the sealed packages 12.

The foregoing sealing operations are all automatically controlled and are progressively indicated by the indicator lamps 124. These operations do not require the operator's attention. Accordingly, during the sealing cycle the operator may load a plurality of covers 18 and bottom portions 16 on the mounting blocks 96 in the loading mechanism 90. As soon as the chamber is opened and the sealed packages removed, the operator may merely lift the transport 100 and swing it over the heaters 58 and quickly deposit the assembled to-be-sealed packages 12 on the heaters 58.

The foregoing loading mechanism 90 employs magnets for lifting the to-be-sealed packages and carrying them to the heaters. This is particularly effective for loading packages wherein at least a portion of the cover 18 includes sufficient magnetic material to be attracted by a magnet. In the event the various portions of the packages are of a non-magnetic nature, for example, glass, the loading mechanism 130 of FIGURE 13 may be employed. This loading mechanism 130 is very similar to the preceding loading mechanism 90. However, it includes a support arm 132 positioned radially of a guide 74 so as to project outwardly therefrom convenient to the operator. The arm 132 includes a separate row of mounting blocks 136 and a row of mounting blocks 138 for each of the heating elements 58. The first mounting blocks 136 in the first row are positioned to correspond to the positions of the heating elements and are adapted to receive the covers 18. The mounting blocks 138 in the second row are also positioned to correspond to the heating elements 58. However, they are adapted to receive inverted bottom portions 16.

A carrier or transport 140 is mounted on the guide 74 for swinging therearound for positioning over the rows of mounting blocks 136 and 138 and over the work surface 50. The transport 140 includes means 142 that are capable of lifting the covers and/or bottom portions. Although any suitable means may be employed, in the present instance, a plurality of vacuum pickups 144 are provided. Each pickup 144 is interconnected with a source of vacuum and is effective when energized to retain a cover 18 or bottom portion 16 attached thereto.

In order to employ this embodiment, a set of covers 18 are mounted on the blocks 136 and a set of bottom portions 16 are mounted on the blocks 138. The transport 140 is then placed over the first row of blocks 136 and the pickups 144 actuated to attract the covers 18. The transport 140 is then lifted and swung into position over the work surface 50 and the pickups 144 deactivated. This will release the covers 18 and deposit them on the heating elements 58. The transport 140 is then positioned on the second row of blocks 138 and the pickups 144 actuated to attract the bottom portions 16. The transport 140 is then raised and swung over the work surface 50 and the pickups 144 deactivated to release the covers 18.

Since the heating elements 58, first mounting blocks 136 and second mounting blocks 138 are all very precisely positioned, the covers 18 and bottom portions 16 will be very precisely aligned with each other and with the heating elements 58. As a consequence, the sealer 10 may be actuated so as to seal the covers 18 to the bottom portions 16.

If the covers 18 are of a material such as glass, the heating elements 58 may be selected to produce enough heat to melt the peripheries 30 of the covers 18 and hermetically bond them to the bottom portions. Even though the covers may include a "hard glass," such as 7052, glass having relatively high melting temperatures, the heat will be concentrated around the periphery. As a result, the temperature of the wafer will always be maintained well below its critical range.

Figure 11:
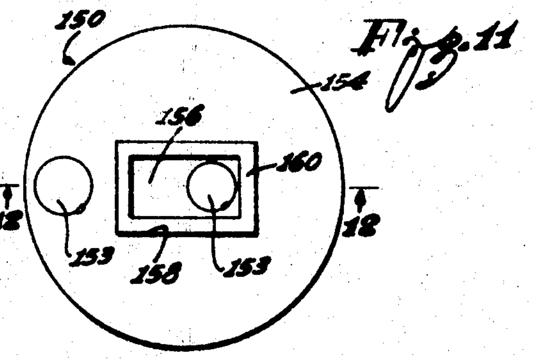
FIGURE 11 is a plan view of another embodiment of a heating unit for use in the sealing machine of FIGURE 1.
Figure 8:
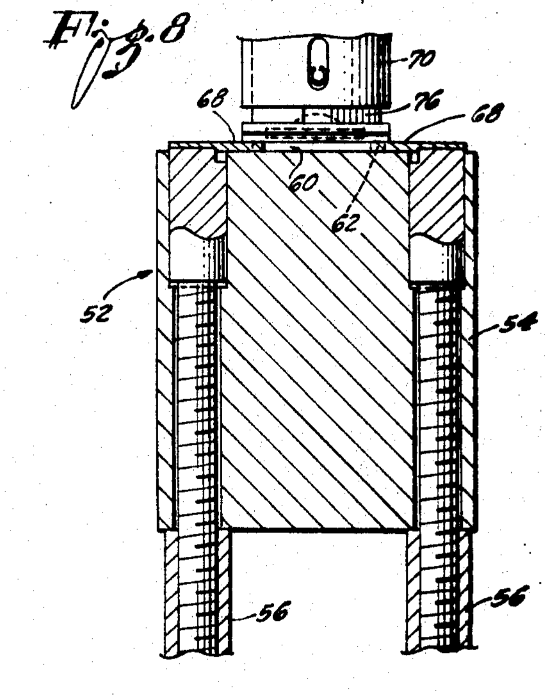
FIGURE 8 is a cross-sectional view taken substantially along the plane of line 8—8 of FIGURE 6 showing the heat unit of FIGURES 4 to 6 and the heat sink of FIGURE 7 in an operative relationship for sealing micromodular packages.
Figures 9, 12, 13:
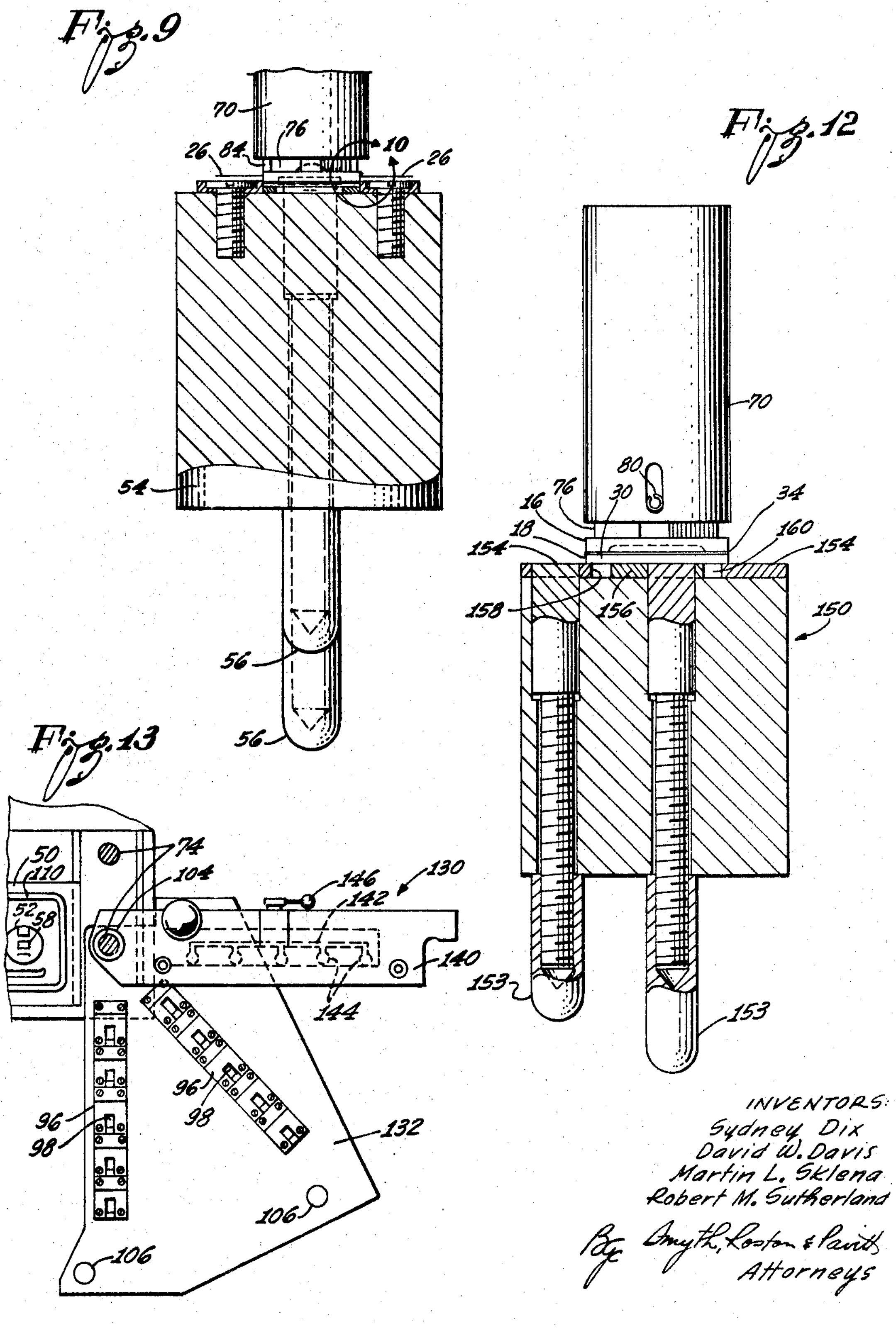
FIGURE 9 is a cross-sectional view similar to FIGURE 8, but taken substantially along the plane of line 9—9 in FIGURE 6.
FIGURE 12 is a cross-sectional view taken substantially along the plane of line 12—12 of FIGURE 11.
FIGURE 13 is a fragmentary view of a sealing machine embodying a modified loading mechanism.

Under some circumstances and particularly when the cover 18 is electrically conductive, it may be desirable to employ the heating units 150 shown in FIGURES 11 and 12. Units 150 are similar to the units 52 and are interchangeable for use in the sealing machine 10. The heater unit 150 includes a substantial cylindrical plug 152 adapted to fit into a socket in the support 48. A pair of downwardly directed contacts 153 project from the lower end of the plug 152 so as to mechanically and electrically engage the supply bus in the support 48.

A pair of electrical contacts 154 and 156 are provided on the top of the plug 152 so as to be disposed in substantially the same position as the first heating elements 58.

The first contact 154 has a circular periphery that is substantially the same as the periphery of the plug 152. The center of the contact 154 includes an opening 158 that is slightly smaller than the cover 18. As a consequence, the edges of the cover 18 will just overlie the edges of the contact 154.

The center contact 156 has an outside dimension that is less than the corresponding dimensions of the cover 18 and the opening 158. As a result, the two electrical contacts are electrically and physically separated from each other by an open air gap 160. The dimensions of this air gap 160 correspond to the dimensions of the periphery of the cover 18. When the cover 18 is seated on these two contacts 154 and 156 the periphery 30 will form an electrically conductive path across the air gap 160. This path will act as a short circuit between the two contacts 154 and 156.

When a potential difference is produced between the two contacts 154 and 156, an electrical current will flow through the periphery 30 of the cover 18. The current flowing through the resistance of the periphery 30 will produce substantial amounts of heat that will raise the temperature of the periphery 30. The dimensions of the air gap may be increased or decreased so as to vary the dimensions of the periphery 30 through which the current flows. As a consequence, the rate of heat produced in any portion of the periphery 30 and transferred into the junction 82 can be tailored to compensate for heat losses resulting from any causes such as the presence or absence of electrical leads 26, etc., and to produce a substantial uniform heating of all regions of the junction.

While only a limited number of embodiments of the present invention have been disclosed, it will be readily apparent to those persons skilled in the art that numerous changes and modifications may be made thereto without departing from the spirit of the present invention. Accordingly, the accompanying drawings and description thereof are for illustrative purposes only and do not in any way limit the present invention which is defined only by the claims which follow.

What is claimed is:

1. An apparatus of the class described for sealing micromodular packages having a plurality of sidewalls defining a space and with an electrical element within said space and a cover that has a periphery hermetically sealed to the sidewalls so as to seal said space, including the combination of:

a heating element having a plurality of segments positioned to engage the periphery of said cover, means for retaining the periphery of said cover positioned on the heating element in intimate heat exchanging contact, said means further being effective to retain the sidewalls positioned on the periphery of said cover to form a junction therebetween, and means effective to energize the heating elements and the segments therein to produce heat in the segments, each of said segments being individually constructed to transfer heat into the adjacent portion of the junction at a rate that will maintain the adjacent portions of said junction at a predetermined temperature in accordance with the different rate that the heat is transferred into the different sidewalls so as to seal the periphery of the cover to the sidewalls without causing damage to the electrical element within said space.

2. An apparatus of the class described for sealing micromodular packages having a base and a plurality of sidewalls defining a space and with an electrical element disposed within said space and a cover that has a periphery hermetically sealed to the sidewalls so as to seal said space, including the combination of:

a heating element, a plurality of segments in said heating element for generating heat, said segments being positioned to engage the periphery of said cover, means for retaining the periphery of said cover in intimate heat exchanging relation with the heating element and with the sidewalls, and means effective to energize the heating elements and the segments therein to produce heat in the segments, each of said segments being individually constructed to transfer heat into the periphery at a rate that is a function of the different rate at which heat is transferred from the periphery into the different sidewalls so as to seal the periphery of the cover to the sidewalls without causing damage to the electrical element within said space.

3. An apparatus of the class described for sealing micromodular packages having a plurality of sidewalls defining a space and with an electrical element within said space and a cover that has a periphery hermetically sealed to the sidewalls to seal said space, including the combination of:

an electrical heating element having a plurality of segments positioned to engage only the periphery of said cover, means for retaining said cover positioned on the heating element with said segments in intimate heat exchanging relation with the periphery, said means further being effective to retain the sidewalls seated on the periphery to form a junction therebetween, and a current source effective to circulate a current through the heating element and the segments therein, each of said segments having a resistance whereby the current flowing therethrough will produce heat that will be transferred into the adjacent portions of the junction, the resistance of each of said segments being a function of the different rate heat is transferred through the adjacent portion of the junction and into the different sidewalls so as to produce a seal between the periphery of the cover and the sidewalls without causing damage to the electrical element within said space.

4. An apparatus of the class described for sealing micromodular packages having a plurality of sidewalls with differing rates of heat dissipation and a cover with a periphery hermetically sealed to the sidewalls to seal a space inside of the sidewalls and with an electrical element disposed within said space, including the combination of:

a heating element, a plurality of segments in said heating element for generating heat, said segments being arranged similar to said sidewall and positioned to engage only the periphery of said cover, and means effective to energize the heating elements and the segments therein to produce heat in the segments, each of said segments being individually constructed to transfer heat into the adjacent periphery at the rate that is proportional to the different rate at which heat is dissipated from the adjacent sidewalls so as to seal the periphery of the cover to the sidewalls without causing damage to the electrical element within said space.

5. An apparatus of the class described for sealing micromodular packages having a plurality of sidewalls partially defining a space, a semiconductive element in said space, a plurality of electrical leads extending through some of the sidewalls and a cover that has a periphery hermetically sealed to the sidewalls to seal the semiconductive element in said space, including the combination of:

a heating element having a plurality of segments arranged similar to said sidewalls and positioned to engage only the periphery of the cover, means for retaining a to-be-sealed package on said heating element with the sidewalls seated on the periphery of the cover and the periphery of said cover in intimate heat exchanging relation with the segments, and means effective to energize the heating elements and the segments therein to produce heat in the segments, the segments located adjacent the sidewalls having said leads therein being constructed and arranged to transfer heat into the periphery of said cover at a rate that is greater than the rate of heat transfer from segments adjacent sidewalls free of said leads so as to seal the periphery of the cover to the sidewalls without causing damage to the semiconductive element in said space.

6. An apparatus of the class described for sealing micromodular packages including a plurality of sidewalls partially defining a space, a semiconductive element in said space, a plurality of electrical leads extending through some of said sidewalls and a cover having a periphery hermetically sealed to the sidewalls so as to seal said semiconductive element in said space, including the combination of:

an electrical heating element, a plurality of segments in said heating element having resistances for generating heat when a current flows therethrough, said segments being arranged similar to said sidewalls so as to engage only the periphery of said cover, and means effective to circulate an electrical current through the heating element and the segments therein to produce heat in the segments, the segments located adjacent the sidewalls containing the electrical leads through the sidewalls having a resistance for generating more heat than the segments not having the leads so as to seal the periphery of the cover to the sidewalls without causing damage to the semiconductive element in said space.

7. An apparatus of the class described for sealing micromodular packages having a base and a plurality of sidewalls defining a space and with an electrical element in said space and a cover that has a periphery hermetically sealed to the sidewalls so as to seal said space, including the combination of:

a heating element having a plurality of segments arranged similar to said sidewalls and positioned to engage only the periphery of said cover, first means for retaining the periphery of said cover positioned on the heating element in intimate heat exchanging relation therewith and retaining the sidewalls seated on the periphery to form a junction therebetween, second means effective to energize the heating element and each of the segments therein to produce heat in the segments, each of said segments being individually constructed and arranged to transfer heat into the periphery at a rate that is a function of the different rate at which heat is transferred from the junction into the different sidewalls so as to seal the periphery of the cover to the sidewalls and to limit any heat damage to the electrical element in said space, and a heat sink constructed and arranged to be in heat exchanging relation with the base so as to absorb heat therefrom and thereby limit the temperature of the base and further limit any heat damage to the electrical element in said space.

8. An apparatus of the class described for sealing micromodular packages having a base, a semiconductive member on said base, a plurality of sidewalls on the base defining a space containing the member and a cover that has a periphery hermetically sealed to the sidewalls so as to seal the member in said space, including the combination of:

a heating element having a plurality of segments arranged similar to said sidewalls and positioned to engage only the periphery of said cover, a heat sink for engaging the base and absorbing heat therefrom, means for resiliently forcing the heat sink against said base to maintain the sidewalls on the periphery of the cover and the periphery positioned on the heating element in intimate heat exchanging relation therewith, second means effective to energize the segments to transfer heat into the periphery at a rate that is a function of the different rate at which heat is dissipated into the different sidewalls so as to seal the periphery of the cover to the sidewalls, and said heat sink being constructed and arranged to absorb heat from the base and limit the temperature of the semiconductive member thereon as the cover is being sealed to the sidewalls.

9. An apparatus of the class described for sealing micromodular packages having a base and a plurality of sidewalls partially defining a space and with an electrical element disposed within said space and a cover that has a periphery hermetically sealed to the sidewalls so as to seal said space, including the combination of:

a heating element having a plurality of segments arranged similar to said sidewalls to engage only the periphery of said cover for transferring heat into the periphery, means effective to energize the heating element and each of said segments therein to heat the segments and transfer heat into the periphery of the cover, and a heat sink positioned to engage preselected portions of said base and absorb different amounts of heat from the different sidewalls so as to protect the electrical element from heat damage as the cover is sealed to the sidewalls.

10. An apparatus of the class described for sealing micromodular packages having a base and a plurality of sidewalls partially defining a space and with an electrical element in said space and a cover that has a periphery hermetically sealed to the sidewalls so as to seal said space, including the combination of:

a heating element having a plurality of segments arranged similar to said sidewalls to engage only the periphery of said cover for transferring heat into the periphery, first means for retaining the periphery of said cover positioned on the heating element in intimate heat exchanging relation therewith, said means further being effective to maintain the sidewalls seated on the periphery to form a junction therebetween effective to transfer heat from the periphery into the sidewalls, second means effective to energize the heating element and each of said segments therein to produce heat in the segments, each of said segments being individually constructed and arranged to transfer heat into the periphery at a rate that is a function of the different rate at which heat is transferred from the junction into the different sidewalls, and a heat sink positioned to engage preselected portions of said base, said heat sink being constructed and arranged to absorb heat from the sidewalls at rates inversely proportional to the rate heat is transferred through the adjacent portions of the junction.

11. An apparatus of the class described for sealing micromodular packages including a base and a plurality of sidewalls partially defining a space, a semiconductive element mounted on the base in said space, a plurality of electrical leads extending through some of said sidewalls and a cover having a periphery hermetically sealed to the sidewalls to seal said semiconductive element in said space, including the combination of:

an electrical heating element, a plurality of segments in said heating element having resistances for generating heat when a current flows therethrough, said segments being arranged similar to said sidewalls so as to engage only the periphery of said cover, means for retaining the periphery positioned on the heating element in intimate heat exchanging relation therewith and the sidewalls seated on the periphery to form a junction therebetween, a current source effective to circulate a current through the heating element and each of said segments therein to produce heat in the segments, the segments disposed adjacent the sidewalls having said leads through the sidewalls therein having more resistance than the segments disposed adjacent the sidewalls without said leads, and a heat sink in heat exchanging relation with the base to absorb heat and thereby limit the temperature of the semiconductive element, said heat sink being effective to absorb more heat from the sidewalls without leads than from the sidewalls having leads.

12. In a machine for sealing a micromodular package having a plurality of sidewalls with a cover having a periphery hermetically sealed to the sidewalls for defining a space and with an electrical element disposed within said space, the combination of:

a work station for receiving the micromodular package and retaining the periphery of said cover in intimate contact with the sidewalls, an electrical heating element positioned to register with the periphery of said cover and transfer heat thereto, and means connected to the heating element for circulating an electrical current therethrough, said element including segments with resistances to produce heat and apply said heat to said periphery, each of said segments having a resistance proportional to the particular rate of heat transfer required to seal the adjacent portion of the periphery of the cover to the different sidewalls without causing damage to the electrical element.

13. In a machine for sealing a plurality of micromodular packages each having a plurality of sidewalls and a cover having a periphery hermetically sealed to the sidewalls to define an enclosed space and with an electrical element within said space, the combination of:

a work surface having a separate socket therein for each package to be seated at a time, a heating unit disposed in each of said sockets, a heating element on each of the heating units, said elements including a plurality of segments and being effective to receive said packages and engage the periphery of said cover, and means connected to the heating element for circulating an electrical current therethrough to produce heat and apply said heat to said periphery and with each segment of the heating element having an individual configuration to produce heat in accordance with the absorption of heat of the individual portions of the periphery so as to produce uniform heating of the periphery to seal the cover to the sidewalls while minimizing the heat applied to the electrical element in said space.

14. In a machine for sealing a plurality of micromodular packages each having a plurality of sidewalls and a cover having a periphery hermetically sealed to the sidewalls to define an enclosed space and with an electrical element within said space, the combination of:

work station having a work surface, a separate plug-in socket in said work station for each of the packages to be sealed at a time, a plug-in heating unit disposed in each of said sockets for receiving the micromodular packages, a heating element on each of the heating units, each of said elements including a plurality of segments having a shape that is substantially identical to the periphery of said cover for being disposed in intimate heat exchanging relation therewith, and means connected to the heating element for circulating an electrical current therethrough to energize said element and apply heat to said periphery and with each segment having a configuration to equalize the heat applied to said periphery so as to seal the cover to the sidewalls while minimizing the heat applied to the electrical element.

15. A plug-in heater unit for use in a sealing machine for use in sealing micromodular packages having a plurality of sidewalls defining a space and with an electrical element in said space and a cover with a periphery hermetically sealed to the sidewalls to seal said space, said heater unit including the combination of:

a plug for being releasably mounted on said sealing machine, an electrical heating element mounted on said plug and having a plurality of segments positioned to register with portions of the periphery of said cover and be maintained in intimate contact with the periphery to apply heat to said periphery for hermetically sealing the periphery to the sidewalls and with the segments each having a configuration to equalize the heat applied to portions of the periphery to minimize the heat applied to the electrical element during sealing, and electrical contacts on said plug electrically interconnected with the heating element and adapted to be electrically interconnected with a current source in said sealing machine for energizing the heating element.

16. A plug-in heater unit for use in a sealing machine for use in sealing micromodular packages having a plurality of sidewalls defining a space and with an electrical element in said space and a cover with a periphery hermetically sealed to the sidewalls to seal said space, said heater unit including the combination of:

a mounting member of thermal insulating material for being releasably mounted on said sealing machine, an electrical heating element mounted on said member, a plurality of segments in said element positioned to register with portions of the periphery of said cover and be maintained in intimate contact with the periphery of said cover to apply heat to said periphery and with the segments each having a configuration to equalize the heat applied to portions of the periphery to minimize the heat applied to the electrical element during sealing, and electrical contacts extending through said mounting member for interconnecting the heating element with a current source in the sealing machine whereby an electrical current flowing through the segments will produce the amount of heat required to hermetically seal the periphery of the cover to the sidewalls.

17. A loading device for use in a sealing machine having a plurality of heating elements constructed and arranged to apply sealing heat to micromodular packages for the sealing covers thereof to the bottom portions thereof, said loading device including the combination of:

a support member disposed adjacent the heating elements, a separate alignment means on said support member for each package to be sealed, said alignment means being positioned to correspond to the positions of the heating elements, a transfer member movable between a first position adjacent said support member and a second position adjacent the heating elements, and means on said transfer member for releasably picking up to-be-sealed packages on the alignment means when said transfer member is in the first position and depositing said to-be sealed packages on said heating elements when said transfer member is in the second position.

18. A loading device for use in a sealing machine having a plurality of heating elements for sealing the covers of micromodular packages to the bottom portions of the micromodular packages, said loading device including the combination of:

a support member disposed adjacent the heating elements, first alignment means disposed on said support member for receiving the covers and retaining them in positions corresponding to the positions of the heating elements, second alignment means for receiving the bottom portions and retaining them in positions corresponding to the positions of the heating elements, a transfer member adapted to be disposed in a first position adjacent said support member and a position adjacent the heating elements, and means on said transfer member for releasably picking up the covers from the first alignment means and depositing them on said heating elements and for releasably picking up bottom portions from the second alignment means and depositing them on the covers positioned on the heating elements.

19. In a machine for sealing micromodular semiconductive packages having a bottom portion and a cover, the combination of:

a plurality of heating elements arranged in a particular configuration for heating the peripheries of the packages to a sufficient temperature to secure the covers to the bottom portions, a first group of workpiece holders disposed in substantially the same configuration as the heating elements for receiving the covers, a second group of workpiece holders disposed in substantially the same configuration as the heating elements for receiving the bottom portions, a transfer member movable between a first position adjacent the first group of workpiece holders, a second position adjacent the second group of workpiece holders and a third position adjacent the heating elements, and means on said transfer member effective to pick up the cover when the transfer member is in the first position to carry the covers to heating elements and deposit them thereon and to pick up the bottom portions when the transfer means is in the second position and deposit them on the covers in a to-be-sealed relation.

References Cited

UNITED STATES PATENTS

| | | | |
|---|---|---|---|
| 2,680,187 | 6/1954 | Anton | 219—235 |
| 3,220,095 | 11/1965 | Smith | 174—52.5 X |
| 3,320,353 | 5/1967 | Smith | 174—52.5 |
| 3,312,540 | 4/1967 | Plumbo et al. | 174—52.5 X |
| 3,312,771 | 4/1967 | Hessinger et al. | 174—52.5 |
| 2,455,186 | 11/1948 | McCormick | 338—221 X |
| 2,649,392 | 8/1953 | Marshall | 53—39 |
| 2,714,416 | 8/1955 | Fener | 219—243 X |
| 2,918,767 | 12/1959 | Grinstead et al. | 53—373 X |
| 3,056,317 | 10/1962 | Huber et al. | 228—46 X |
| 3,069,531 | 12/1962 | Hill et al. | 219—78 |
| 3,152,944 | 10/1964 | Mojonnier et al. | 156—583 X |
| 3,167,736 | 1/1965 | Temple | 338—221 |
| 3,190,051 | 6/1965 | Souligney | 53—373 X |
| 3,221,910 | 12/1965 | Izumi | 214—1 X |
| 3,271,625 | 9/1966 | Caracciolo | 317—101 |
| 3,300,065 | 1/1967 | Witmer | 214—1 X |

RICHARD M. WOOD, *Primary Examiner.*

B. A. STEIN, *Assistant Examiner.*